(12) United States Patent
Vogel et al.

(10) Patent No.: US 12,736,136 B2
(45) Date of Patent: Sep. 15, 2026

(54) HANGER SEAL FOR LOW TEMPERATURE APPLICATIONS

(71) Applicant: Cameron International Corporation, Houston, TX (US)

(72) Inventors: Leonard Vogel, Houston, TX (US); Payal Desai, Houston, TX (US); Arianne Elder, Houston, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 19/046,593

(22) Filed: Feb. 6, 2025

(65) Prior Publication Data

US 2026/0226983 A1 Aug. 6, 2026

(51) Int. Cl.
*F16J 15/32* (2016.01)
*F16J 15/3204* (2016.01)

(52) U.S. Cl.
CPC ................................ *F16J 15/3204* (2013.01)

(58) Field of Classification Search
CPC .. F16J 15/3204; F16J 15/3212; F16J 15/3216; F16J 15/3236; F16J 15/18; F16J 15/183; F16J 15/185
See application file for complete search history.

(56) References Cited

U.S. PATENT DOCUMENTS

| | | | | |
|---|---|---|---|---|
| 4,823,871 A | | 4/1989 | McEver | |
| 5,720,503 A | * | 2/1998 | Drijver | F16J 15/3236 285/98 |
| 5,799,953 A | * | 9/1998 | Henderson | F16J 15/3236 277/567 |
| 8,894,070 B2 | * | 11/2014 | Bhat | E21B 33/126 277/553 |
| 10,563,475 B2 | | 2/2020 | Zhou | |
| 10,907,428 B2 | | 2/2021 | Luke | |
| 2008/0029264 A1 | | 2/2008 | Williams | |
| 2009/0194945 A1 | * | 8/2009 | Bhat | E21B 33/1212 277/300 |
| 2017/0159399 A1 | | 6/2017 | Sommerfeld | |
| 2024/0125209 A1 | | 4/2024 | Qin | |

FOREIGN PATENT DOCUMENTS

EP 4185764 B1 9/2024

* cited by examiner

*Primary Examiner* — Christine M Mills
*Assistant Examiner* — L. Susmitha Koneru
(74) *Attorney, Agent, or Firm* — Kyle R. Miiller

(57) ABSTRACT

A system includes an annular seal that includes an annular seal jacket, such that the annular seal jacket includes an annular base, first and second annular walls coupled to the annular base, and an annular chamber disposed between the first and second annular walls. Additionally, the annular seal includes a first spring disposed in the annular chamber and a second spring disposed in the annular chamber.

20 Claims, 5 Drawing Sheets

211
16
200
12
14
15

211
16
78
92
202
203
210
204
12
74
209
208
90
14
207
200
205
206
15

14
12, 150
16
250

209
74
12, 150
208
207
14
206
78
16
202
250
254
262
260

HANGER SEAL FOR LOW TEMPERATURE APPLICATIONS

BACKGROUND

The present disclosure generally relates to seals within a fluid system. More particularly, the present disclosure relates to seals utilized in low temperature applications and methods for installing these seals.

This section is intended to introduce the reader to various aspects of art that may be related to various aspects of the presently described embodiments, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

To meet consumer and industrial demand for natural resources, companies often invest significant amounts of time and money in searching for and extracting oil, natural gas, hydrocarbons, and other subterranean resources from the earth. Particularly, once a desired subterranean resource such as oil or natural gas is discovered, drilling and production systems may be employed to access and extract the resource. Further, such systems may include wellhead assemblies mounted on wells through which resources are accessed or extracted. Such wellhead assemblies may include a variety of components, such as various spools, casings, valves, pumps, fluid conduits, and the like, that control drilling or extraction operations.

In these wellhead assemblies, seals may be deployed amongst the wellhead assembly components for a variety of purposes (e.g., retaining pressure, preventing fluid/air leaks, prevent environment contaminants from entering the wellhead assembly, etc.). However, some operating and/or environmental conditions may affect the performance of these seals. For example, materials utilized in the seal may become more rigid at low temperatures, thereby reducing the effectiveness of the seal. In some cases, during installation, the seal may be exposed to rough surface finishes, abrasive fluids, or debris before being installed at the final sealing surface. Efforts to improve the effectiveness and functionality of these seals may be advantageous.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

In certain embodiments, a system includes an annular seal that includes an annular seal jacket, such that the annular seal jacket includes an annular base, first and second annular walls coupled to the annular base, and an annular chamber disposed between the first and second annular walls. Additionally, the annular seal includes a first spring disposed in the annular chamber and a second spring disposed in the annular chamber.

In certain embodiments, a system includes a first annular body configured to be run into a second annular body, such that the first annular body includes an outer annular recess configured to receive an annular seal and an outer annular surface having a taper configured to drive the annular seal into a seal pocket between the first and second annular bodies.

In certain embodiments, a method includes running a first annular body into a second annular body, such that the first annular body includes an outer annular recess, an annular seal disposed in the outer annular recess, and an outer annular surface having a taper, and drive the annular seal along the taper into a seal pocket between the first and second annular bodies upon reaching a ledge in the second annular body.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness. These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
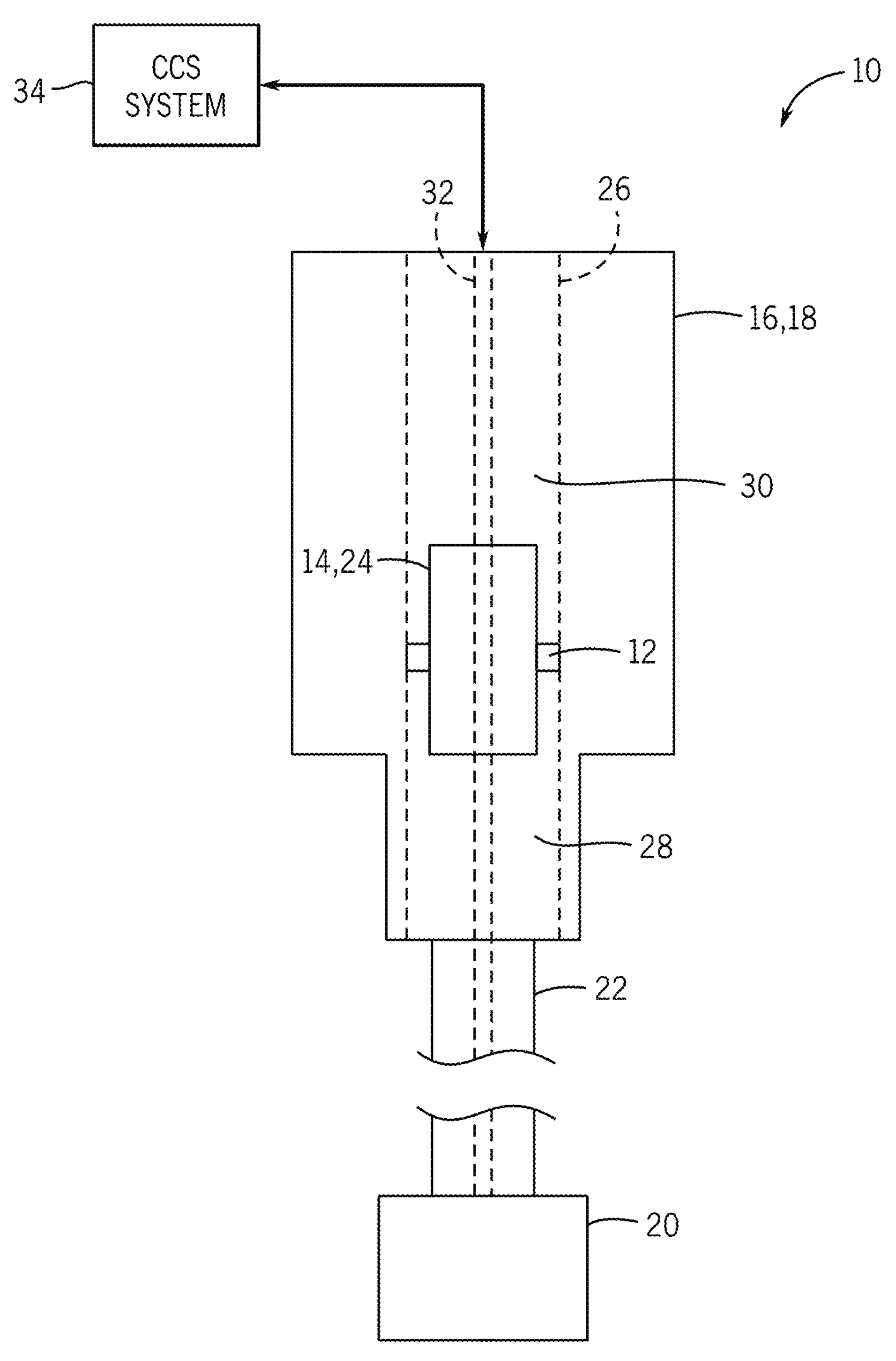
FIG. 1 is a block diagram of a seal disposed in a drilling and production system, in accordance with aspects of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms “inner” and “outer”; “up” and “down”; “upper” and “lower”; “upward” and “downward”; “above” and “below”; “inward” and “outward”; and other like terms as used herein refer to relative positions to one another and are not intended to denote a particular direction or spatial orientation. The terms “couple,” “coupled,” “connect,” “connection,” “connected,” “in connection with,” and “connecting” refer to “in direct connection with” or “in connection with via one or more intermediate elements or members.”

Furthermore, when introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment,” “an embodiment,” or “some embodiments” of the present disclosure are not intended to be interpreted as excluding the existence of additional embodiments that also incorporate the recited features. Furthermore, the phrase A “based on” B is intended to mean that A is at least partially based on B. Moreover, unless expressly stated otherwise, the term “or” is intended to be inclusive (e.g., logical OR) and not exclusive (e.g., logical XOR). In other words, the phrase A “or” B is intended to mean A, B, or both A and B.

Certain terms are used throughout the description and claims to refer to particular features or components. As one skilled in the art will appreciate, different persons may refer to the same feature or component by different names. This document does not intend to distinguish between components or features that differ in name, but not function.

For decades, humans have relied on resources found below the earth’s surface to meet increasing energy demands. These resources include but are not limited to natural gas, coal, hydrocarbons, petroleum, and other materials suitable to generate energy for consumption by humans. As energy demands increase, significant efforts are expended by drilling and production systems to extract an appropriate supply of energy to meet the increasing demand. Included in these efforts are systems and methods that enable expanded extraction of these subterranean resources, increased efficiency of these systems, and technological advances that permit extraction and exploration in areas that were previously inaccessible for energy production. For example, recent efforts include the expansion of energy exploration into areas with environmental conditions that complicate resource extraction. That is, some environmental conditions (e.g., low temperatures, high temperatures, high pressures, extreme weather patterns, etc.) may complicate production efforts, as the environmental conditions may affect how some components within the drilling and production systems interact with the environment or with one another. In addition, some extraction and exploration processes (e.g., carbon ($CO_2$) capture and injection) may subject components within the system to extreme low temperatures.

Some drilling and production systems include a wellhead assembly that may serve as an interface point between the drilling and production systems and the subterranean resources. In certain embodiments, the wellhead assembly may couple to a borehole that may be drilled through the surface of the earth to enable access to the subterranean resources. In other embodiments, the wellhead assembly may provide an interface for various carbon capture and injection applications. The wellhead assembly may include a variety of components, such as various spools, casings, valves, pumps, fluid conduits, and so forth. Taken together, the wellhead assembly and its associated components may be configured to modulate and/or direct flow of the production resources and/or carbon once they have reached the surface. To facilitate the flow of the production resources, the wellhead assembly may include one or more seals (e.g., gaskets, o-rings, sealing components, etc.) that may be deployed at certain positions throughout the wellhead assembly. In certain embodiments, the seals may serve a variety of purposes, including but not limited to retaining pressure, preventing fluid/air leaks from intended fluid flow paths, preventing ingress of environmental contaminants, and so forth. As mentioned above, the performance of some of the seals utilized within an annular region within the wellhead assembly may be affected when subjected to certain environmental and/or operating conditions. Further, in some cases, assembling the aforementioned seals into the annular region of the wellhead assembly may introduce an additional set of issues, as rough surfaces and/or debris may be encountered by the seal prior to arriving at a final sealing surface.

With this in mind, present embodiments described herein are directed towards an improved seal design to accommodate for harsh environmental and/or operating conditions, as well as improved methods for installing the seal into the wellhead assembly that reduces the seal’s interaction with undesired surfaces and mediums. For example, in some embodiments, a seal (e.g., seal assembly) may include a seal packing ring (e.g., pakring), a seal jacket with one or more springs, and a back-up ring. In some cases, the seal jacket may be manufactured out of a thermoplastic material and the one or more springs may be configured to bias one or more exterior surfaces of the seal jacket to contact an interior surface within the wellhead assembly. In certain embodiments, the seal jacket may have a reduced cross-sectional area (e.g., thickness, second moment of area, etc.), thereby enabling increased pliability and flexibility of the seal jacket. Further, the one or more springs may provide an elevated biasing force to the seal jacket, improving the sealing capability between the seal jacket and the wellhead assembly through the annular region.

Additionally or alternatively, present embodiments provide for an improved installation method for disposing the seal within the wellhead assembly. Present embodiments may include utilizing a ramp mechanism that may be placed into the wellhead assembly below (e.g., downhole) of the seal prior to the installation of an appropriate component into the wellhead. The seal may be disposed above (e.g., on top of) the ramp mechanism as the component is assembled into the wellhead. By virtue of the geometry of the seal and the ramp mechanism, the seal may contact an external circumferential surface of the component during installation, but may not contact an internal circumferential surface of the wellhead. In some embodiments, as the component slides down into the wellbore, the ramp mechanism may be configured to translate the seal into position in between the component and the wellhead. In so doing, the ramp mechanism enables the seal to assemble into the position to seal the annular region of the wellhead assembly and avoid potential rough surfaces or debris that may be present along the internal surface of the wellhead assembly that is not a final sealing surface. Present embodiments facilitate the installation of the seal to reduce premature damage (e.g., lacerations, cuts, stretching, extrusions, etc.) of the seal before it arrives at the final sealing surface, and improved physical geometry that provide for the seal to better seal the annular region of the wellhead, even when subjected to harsh conditions. Additionally, embodiments of the seal are designed to withstand various oil and gas environments, including extremely high or low temperatures and pressures. For example, embodiments of the seal may be used in carbon capture and sequestration (CCS) systems, which involve the capture and storage of carbon dioxide ($CO_2$) in subterranean reservoirs.

Turning to the drawings, FIG. 1 is a partial cross-sectional view of an embodiment of a drilling and production system 10 having one or more seals 12 between an inner body 14 and an outer body 16. In certain embodiments, the drilling and production system 10 includes a mineral extraction system for the extraction of subterranean natural resources, such as oil and gas. For example, in the illustrated embodiment, the outer body 16 includes a wellhead 18 coupled to a mineral deposit 20 via a well 22. The inner body 14 may include a hanger 24 (e.g., casing hanger, tubing hanger, etc.) disposed in a wellhead bore 26 and supported by the wellhead 18, for example. In the case of mineral extraction systems, the inner body 14 and the outer body 16 may include or be coupled to any number of components, such as christmas trees, casing hangers, casing heads, casing strings, tubing hangers, tubing heads, tubing strings, running tools, blowout preventers, valves, flanges, and so forth. In the case of carbon capture and injection systems, tubing 32 may be disposed within the wellhead bore 26 enabling carbon to flow between a carbon capture and sequestration (CCS) system 34 disposed on the surface and the mineral deposit 20. The tubing 32 may be configured to receive pressurized carbon dioxide ($CO_2$) from the CCS system 34 and provide a conduit to inject the gas into the mineral deposit 20 through the tubing 32 and wellhead bore 26. In other embodiments, the tubing 32 may be configured to direct $CO_2$ from the mineral deposit 20 up to the CCS system 34. The CCS system 34 may include various conduits, pipelines, valves, storage tanks, compressors, and controllers configured to route pressurized $CO_2$ gas to the mineral deposit 20 via the tubing 32, and additionally configured to receive and subsequently store $CO_2$ gas. As a result, drilling and production systems that utilize carbon dioxide enhanced oil recovery may extract more subterranean resources than would otherwise be possible.

In mineral extraction, carbon capture, and similar systems, the seal 12 may be used with working pressures up to 20,000 pounds per square inch (psi). In certain embodiments, the seal 12 may be used to isolate regions of gases or fluids with pressure differentials across the seal of 15,000 psi or greater. Further, the operating environment of such systems may include temperatures ranging from −112° F. to 400° F. For example, in carbon capture or injection applications, the operating conditions may include temperatures as low as −112° F. (−80° C.). As discussed in further detail below, the seal 12 may be configured to resist thermal shock when used in applications that experience wide temperature ranges.

Certain exemplary low-temperature seal embodiments described herein include systems and methods which address one or more of the above-mentioned challenges of operating a seal 12 in harsh environmental and/or operating conditions, such as exposure to corrosive fluids, extreme pressures, and extreme temperatures. As explained in greater detail below, the disclosed embodiments include a seal 12 having a seal jacket made out of a thermoplastic material, and the seal jacket may include a cross-sectional profile that may include protrusions and/or grooves (e.g., annular protrusions and/or annular grooves) on an outer circumferential surface of the seal 12 that may contact the wellhead bore 26. This contact between the seal 12 and the wellhead bore 26 may form a fluid seal configured to isolate a first region 28 of gases or fluids from additional regions 30 of gases or fluids within the drilling and production system 10. In some embodiments, the protrusions and/or grooves on the seal 12 may function to create higher contact stresses near the protrusions and/or grooves and may force the thermoplastic material used for the seal jacket to slightly deform into a cavity formed by the protrusion and/or groove, thereby more effectively sealing between the inner and outer bodies 14, 16 and the seal 12.

Additionally or alternatively, the seal 12 embodiments described herein may be capable of operation across a broader spectrum of temperatures and pressures. As described above, the environments within which the seals 12 operate are frequently transitioned between hot and cold temperature cycles. Tests have shown that the seals 12 described herein may be capable of maintaining 10,000 psi while cycling between approximately −112° F. (−80° C.) and approximately 250° F. (121° C.). Therefore, the seal 12 embodiments described herein may maintain greater pressure than typical seals across a wider range of temperatures than typical seals.

Figure 2:
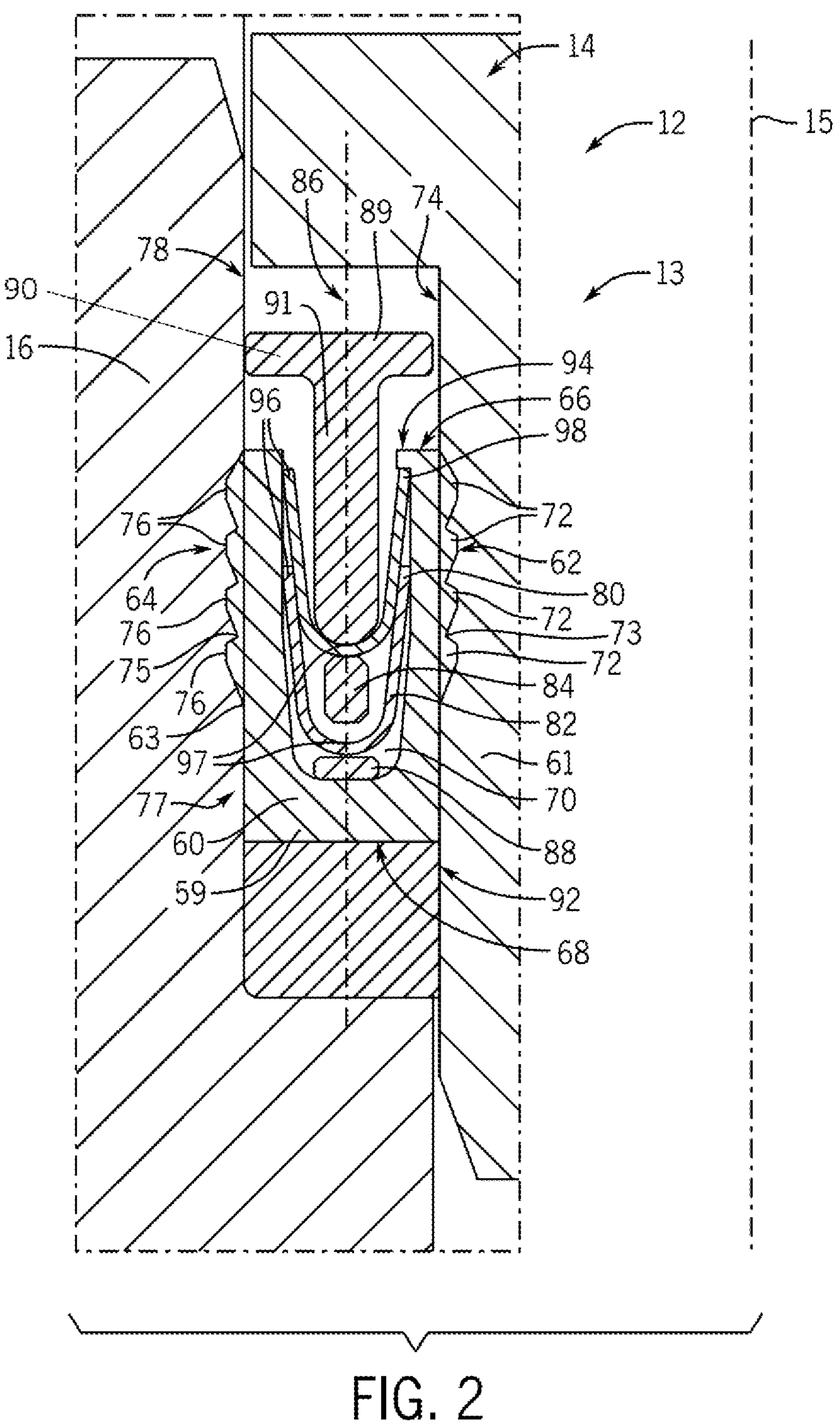
FIG. 2 is a cross-section of an embodiment of a seal disposed in the drilling and production system of FIG. 1, in accordance with aspects of the present disclosure.

FIG. 2 illustrates a cross-sectional view of an exemplary embodiment of the seal 12 (e.g., seal assembly) disposed between the inner body 14 and the outer body 16. As discussed previously, in certain embodiments, the inner body 14 may be a hanger 24 (e.g., a casing hanger), and the outer body 16 may be a wellhead 18. However, the inner and outer bodies 14 and 16 may be any annular equipment, tubing, heads, hangers, or the like. In some embodiments, the bodies 14 and 16 may be reversed as outer and inner bodies, rather than inner and outer bodies. In the illustrated embodiment, the seal 12 includes a nested seal assembly 13 having a seal jacket 60 (e.g., annular seal jacket), a bottom spacer 88 (e.g., annular spacer), a spring 82 (e.g., annular spring), a spacer 84 (e.g., annular spacer), a spring 80 (e.g., annular spring), and a seal packing ring or pakring 90 (e.g., annular packing insert). As illustrated, the bottom spacer 88 is disposed in the seal jacket 60, the spring 82 is disposed in the seal jacket 60 over the bottom spacer 88, the spacer 84 is disposed in the seal jacket 60 within the spring 82, the spring 80 is disposed in the seal jacket 60 within the spring 82 over the spacer 84, and the pakring 90 is disposed in the seal jacket 60 within the spring 80. In operation, the bottom spacer 88, the spring 82, the spacer 84, the spring 80, and the pakring 90 are sequentially inserted in an axial direction into the seal jacket 60 to form the nested seal assembly 13, which is then axially compressed between the inner and outer bodies 14 and 16 to energize the seal 12. As discussed below, the seal jacket 60, the bottom spacer 88, the spring 82, the spacer 84, the spring 80, and the pakring 90 may be made of polymers (e.g., thermoplastic, polytetrafluoroethylene (PTFE), filled PTFE, elastomer, etc.), metals (e.g., stainless steel), or any combination thereof. For example, the seal jacket 60 may be made of polymers (e.g., thermoplastic, polytetrafluoroethylene (PTFE), filled PTFE, elastomer, etc.), whereas the springs 80 and 82 may be made of metals (e.g., stainless steel). Various aspects of the seal are discussed in further detail below.

In the illustrated embodiment, the seal jacket 60 may include a base 59, an inner wall 61 (e.g., annular wall) coupled to the base 59 and having an inner face 62 (e.g., annular face), an outer wall 63 (e.g., annular wall) coupled to the base 59 and having an outer face 64 (e.g., annular face). Additionally, the seal jacket 60 includes a top face 66 (e.g., axial end face) at tops of the inner and outer walls 61 and 63, a bottom face 68 (e.g., axial end face) at a bottom of the base 59, and an interior chamber 70 (e.g., annular chamber) defined between the inner and outer walls 61 and 63. The inner face 62 of the inner wall 61 may include one or more inner face protrusions 72 (e.g., radially extending annular protrusions, ribs, or teeth) that are configured to interface with an outer circumferential surface 74 (e.g., annular surface) of the inner body 14. In other words, each inner face protrusion 72 extends circumferentially about a central axis 15 of the seal 12 and extends or protrudes in a radial direction relative to the central axis 15 of the seal 12. Additionally, an annular recess or groove 73 is disposed between each pair of adjacent protrusions 76. In the illustrated embodiment, the inner face 62 of the seal jacket 60 includes four (4) inner face protrusions 72, however, greater or fewer inner face protrusions 72 (1, 2, 3, 5, 6, 7, 8, etc.) are considered within the scope of the present disclosure. When the one or more inner face protrusions 72 on the seal jacket 60 contacts (e.g., interfaces, pushes against, etc.) the outer circumferential surface 74 of the inner body 14, the inner face 62 of the seal jacket may form a fluid barrier and may substantially block or prevent fluid and/or gases from traveling through the fluid barrier.

Additionally or alternatively, the outer face 64 of the outer wall 63 may include one or more outer face protrusions 76 (e.g., radially extending annular protrusions, ribs, or teeth) that are configured to interface with an inner circumferential surface 78 of the outer body 16. In other words, each protrusion 76 extends circumferentially about a central axis 15 of the seal 12 and extends or protrudes in a radial direction relative to the central axis 15 of the seal 12. Additionally, an annular recess or groove 75 is disposed between each pair of adjacent protrusions 76. In the illustrated embodiment, the outer face 64 of the seal jacket 60 includes four (4) protrusions, however, greater or fewer protrusions (1, 2, 3, 5, 6, 7, 8, etc.) are considered within the scope of the present disclosure. When the one or more protrusions 76 on the outer face 64 of the seal jacket 60 makes contact (e.g., interface with, pushes against, etc.) with the inner circumferential surface 78, the outer face 64 of the seal jacket 60 forms a fluid barrier (e.g., seal) and blocks fluid and/or gases from traveling through the fluid barrier. In certain embodiments, the seal jacket 60 may be made of one or more polymers (e.g., thermoplastic, polytetrafluoroethylene (PTFE), elastomer, etc.).

In certain embodiments, the seal 12 may include multiple springs 80, 82 (e.g., annular springs) that may be disposed in the interior chamber 70 of the seal jacket 60. The springs 80, 82 are generally made of a different material than the seal jacket 60, such as a metal material (e.g., stainless steel). In the illustrated embodiment, the seal 12 includes two (2) springs, but it should be understood that a lesser or greater number of springs (1, 3, 4, 5, 6, 7, 8, etc.) is considered within the scope of the various embodiments of the present techniques. In some embodiments, the multiple springs 80, 82 may have a substantially U-shaped profile 77 (e.g., U-shaped cross-sectional profile) extending circumferentially about the central axis 15, wherein the U-shaped profile 77 includes opposite branches 96 and 98 (e.g., annular branches) extending axially away from a base 97 (e.g., annular base). In the illustrated embodiment, the branches 96 and 98 diverge away from one another (e.g., away from centerline 86) in the axial direction away from the base 97, wherein the branches 96 and 98 are angled at an acute angle relative to the central axis 15. For example, the acute angle of the branches 96 and 98 may be greater than or equal to 1, 2, 3, 4, or 5 degrees and/or less than or equal to 10, 15, 20, 25, or 30 degrees. In some embodiments, the acute angle may range between 1 to 30 degrees, 2 to 20 degrees, or 3 to 15 degrees. As a result of this geometry, each spring of the multiple springs 80, 82 may be configured to output two (2) biasing forces, each biasing force applied at a top end of each branch 96, 98 of the U-shaped profile 77. In some embodiments, the multiple springs 80, 82 may have a substantially constant thickness throughout the cross-section of the spring, and in other embodiments, the thickness of the spring may be variable through the cross-section. For example, in one embodiment, the first spring 80 may have a first branch 96 that has a greater thickness than a second branch 98 of the first spring 80, or vice versa. In some embodiments, the multiple springs 80, 82 may be configured to output a greater biasing force on a branch of the spring that has a greater thickness, and in other embodiments, the multiple springs 80, 82 may be manufactured such that the thickness is constant throughout the cross-section, leading to a substantially equal biasing force being output by each branch 96, 98 of the spring 80, 82. The multiple springs 80, 82 may have a thickness that ranges between 0.018"-0.020", 0.015"-0.025", 0.010"-0.030", or some otherwise appropriate range. In certain embodiments, the springs 80, 82 may have the same or different thicknesses, acute angles, materials, sizes, or any combination thereof.

The multiple springs 80, 82 may be configured to provide the biasing force to internal walls of the seal jacket 60, thereby urging the inner face 62 and the outer face 64 of the seal jacket 60 away from one another (e.g., away from a centerline 86 of the U-shaped profile 77 of the seal 12). For example, the first spring 80 may be configured to provide a first biasing force to a first internal wall of the seal jacket 60, and the first internal wall of the seal jacket 60 may transpose the first biasing force to the inner face 62 of the seal jacket 60. That is, the first biasing force may facilitate the creation of the fluid barrier (e.g., seal) between the inner face 62 of the seal jacket 60 and the outer circumferential surface 74 of the inner body 14. Additionally or alternatively, the first spring 80 may be configured to provide a second biasing force to a second internal wall of the seal jacket 60, and the second internal wall of the seal jacket 60 may transpose the second biasing force to the outer face 64 of the seal jacket 60. That is, the second biasing force may facilitate the creation of the fluid barrier (e.g., seal) between the outer face 64 of the seal jacket 60 and the inner circumferential surface 78 of the outer body 16. Similar to the first spring 80, in the illustrated embodiment, the second spring 82 may similarly be configured to provide a third biasing force to an additional portion of the first internal wall of the seal jacket 60, and a fourth biasing force to an additional portion of the second internal wall of the seal jacket 60.

In some embodiments, each pair of adjacent springs of the multiple springs 80, 82 may have a spacer 84 (e.g., annular spacer) disposed in between the pair of adjacent springs 80, 82. The spacer 84 may be configured to facilitate a more even distribution of the biasing forces provided by the multiple springs 80, 82 to the internal walls of the seal jacket 60. That is, the spacer 84 may enable the multiple springs 80, 82 to distribute the biasing forces (e.g., the first, second, third, and fourth biasing forces) over a desired axial distance or range along the interior chamber 70 of the seal jacket 60. In embodiments where the seal 12 includes more than two (2) springs, additional spacers 84 may be included. For example, in embodiments where the seal 12 includes "n" number of springs 80, 82, the seal 12 may include "n−1" number of spacers 84. In some embodiments, the spacer 84 may be made from a metal alloy, a composite, a thermoplastic, wood, or otherwise appropriate material. In the illustrated embodiment, the spacer 84 axially spaces the bases 97 of the springs 80, 82 by an axial distance, thereby providing a similar spacing of the tops of the branches 96 and 98. Thus, the biasing forces applied at the tops of the branches 96 and 98 are spaced over the desired axial distance or range as noted above. In certain embodiments, the springs 80, 82 directly contact the spacer 84 on opposite upper and lower surfaces of the spacer 84.

In some embodiments, the spacer 84 may have a substantially rectangular cross-section. For example, in the illustrated embodiment, the spacer 84 has a rectangular cross-section with a first length of the spacer 84 in the vertical direction greater than a second length of the spacer in a horizontal direction. However, in other embodiments, the cross-section of the spacer may be a square, an oval, a circle, or otherwise suitable cross-section. In yet other embodiments, the spacer 84 may be arranged such that the first length of the spacer 84 in the vertical direction may be less than the second length of the spacer in the horizontal direction. In any case, the spacer 84 may be configured to provide appropriate spacing between adjacent springs 80, 82 within the seal 12, such that the multiple springs 80, 82 may provide a properly distributed biasing force that enables the creation of the fluid barriers. Additionally or alternatively, the seal 12 may include a bottom spacer 88 that may be disposed on a bottom wall of the interior chamber 70 of the seal jacket 60. The bottom spacer 88 may be configured to provide a stopping point to the multiple springs 80, 82, so that the first spring 80 and the second spring 82 may not be positioned too low (e.g., at a vertical position further away from the top face 66 of the seal jacket 60) to provide adequate biasing forces to the inner and outer faces 62, 64 of the seal jacket 60.

The multiple springs 80, 82 may be assembled into the seal jacket 60 by utilizing a pakring 90. In certain embodiments, the pakring 90 may provide an axial force (e.g., a downward vertical force) to a center portion of the first spring 80 in the multiple springs, and thereby temporarily deform the shape of the multiple springs 80, 82 so that they may slide into the interior chamber 70 of the seal jacket 60. In the illustrated embodiment, the top face 66 of the seal jacket 60 includes a lip 94 (e.g., radially protruding annular lip) that may be configured to provide a locking feature that restricts the multiple springs 80, 82 from moving out of the seal jacket 60. Additionally or alternatively, the pakring 90 may have a T-shape (e.g., T-shaped cross-section) having a head portion 89 coupled to an axial portion 91 configured to interface with the first spring 80.

The seal 12 may additionally include a backup ring 92. The backup ring 92 may be configured to interface with the bottom face 68 of the seal jacket 60 and sit on a ledge of the outer body 16. In some embodiments, the backup ring 92 may be configured to reduce a possibility of the seal 12 (e.g., the seal jacket 60) extruding through a clearance gap between the inner body 14 and the outer body 16. That is, the backup ring 92 may provide an additional layer of protection from premature failure of the seal 12 and the seal jacket 60. In some embodiments, the backup ring 92 may be manufactured from a material that has a higher hardness value than the material (e.g., thermoplastic material) utilized to form the seal jacket 60.

As discussed above, the seal 12 may perform better than traditional sealing arrangements when subjected to harsh environmental and/or operating conditions. For example, the seal jacket 60 made from the thermoplastic material may have a thinner cross-section than conventional seal jackets. In certain embodiments, a radial wall thickness of the inner and outer walls 61 and 63 is less than or equal to 10, 15, 20, 25, or 30 percent of a radial dimension of the seal jacket 60 between the inner and outer faces 62 and 64 (e.g., at the base 59). By virtue of this geometry, the seal jacket 60 may have increased flexibility and pliability to deform when actuated by the multiple springs 80, 82. Additionally or alternatively, the multiple springs 80, 82, spaced out within the interior chamber 70 of the seal jacket 60 by the spacer 84, are configured to output a greater total biasing force that may be transposed onto the inner and outer faces 62, 64 of the seal jacket 60. These taken together in combination enables the seal 12 to create a better fluid barrier between the inner body 14 and the outer body 16, even when the drilling and production system 10 is subjected to harsh environmental and/or operating conditions.

Figure 3:
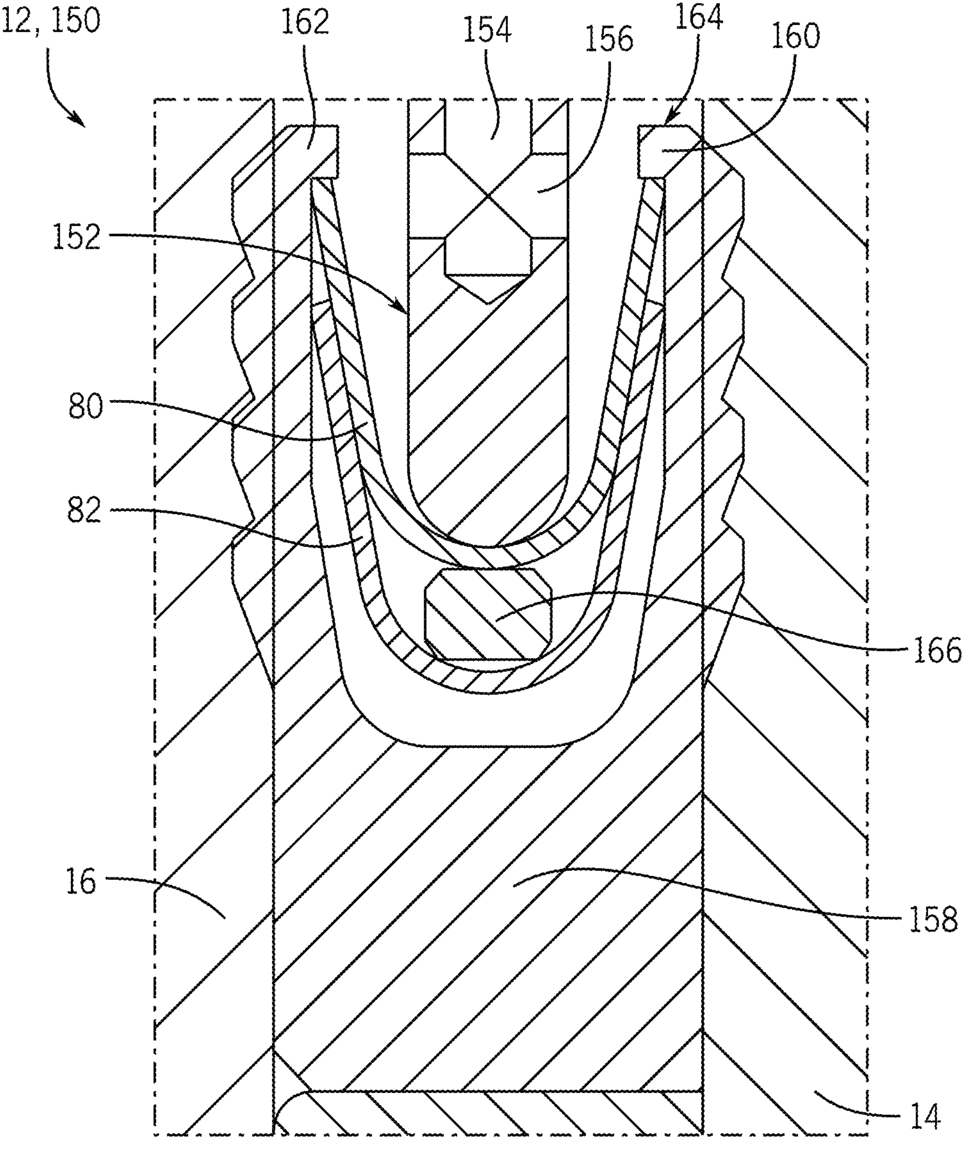
FIG. 3 is a cross-section of an embodiment of a seal disposed in the drilling and production system of FIG. 1, in accordance with aspects of the present disclosure.

FIG. 3 illustrates an embodiment of the seal 150 that may be utilized within the drilling and production system 10. The seal 150 is substantially the same as the seal 12 in FIG. 2, except for the following differentiating characteristics. For example, the pakring 152 may include one or more pressure balancing passages (e.g., pressure relief passages), such as a blind vertical bore 154 and a through transverse bore 156 in the pakring 152. The vertical bore 154 and the transverse bore 156 may be configured to enable fluids or gases to balance from one side of the pakring 152 to the other side, thereby reducing pressure forces that may interact on one or more faces of the pakring 152. Additionally, the seal 150 may include a seal jacket 158 (e.g., annular seal jacket) that includes first and second lips 160 and 162 (e.g., radially protruding annular lips) that may be disposed on the top face 164 of the seal jacket 158. The first and second lips 160 and 162 protrude inwardly toward one another. In contrast with the embodiment illustrated in FIG. 2, the seal jacket 158 in this embodiment has two lips (i.e., first and second lips 160 and 162) rather than a single lip 94. However, the embodiment of FIG. 2 also may include two lips (i.e., first and second lips 160 and 162), the vertical bore 154, and/or the transverse bore 156 similar to FIG. 3. Similar to the lip 94 of FIG. 2, the first and second lips 160 and 162 are configured to retain the springs 80, 82 within the seal jacket 158. Further, in the illustrated embodiment, the spacer 166 (e.g., annular spacer) disposed between the first spring 80 and the second spring 82 may be oriented in a different position and/or shaped differently in FIG. 3. That is, the vertical length of the spacer 166 may be shorter than the horizontal length of the spacer 166 in the embodiment of FIG. 3. By virtue of this arrangement, the spacer 166 in the illustrated embodiment may enable the seal jacket 158 to house additional springs and/or space the springs 80, 82 closer together in the axial direction. Additionally, the embodiment of FIG. 3 eliminates the bottom spacer 88 of FIG. 2.

Figure 5:
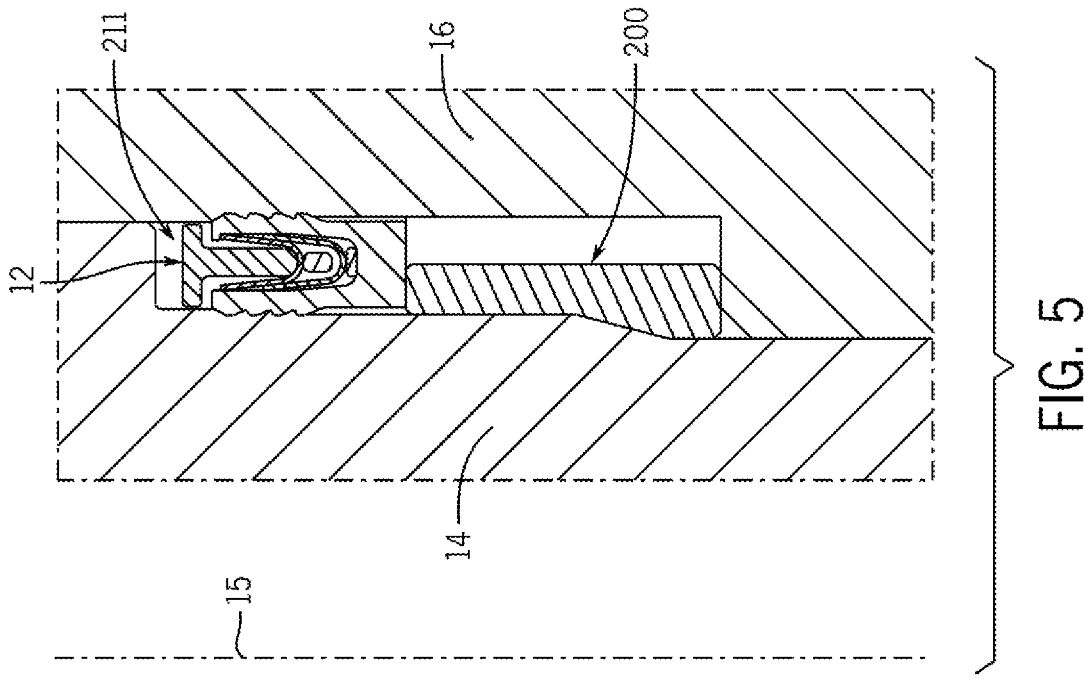
FIGS. 4 and 5 are cross-sectional views of an embodiment of a seal being installed within the drilling and production system of FIG. 1, in accordance with aspects of the present disclosure.
Figure 4:
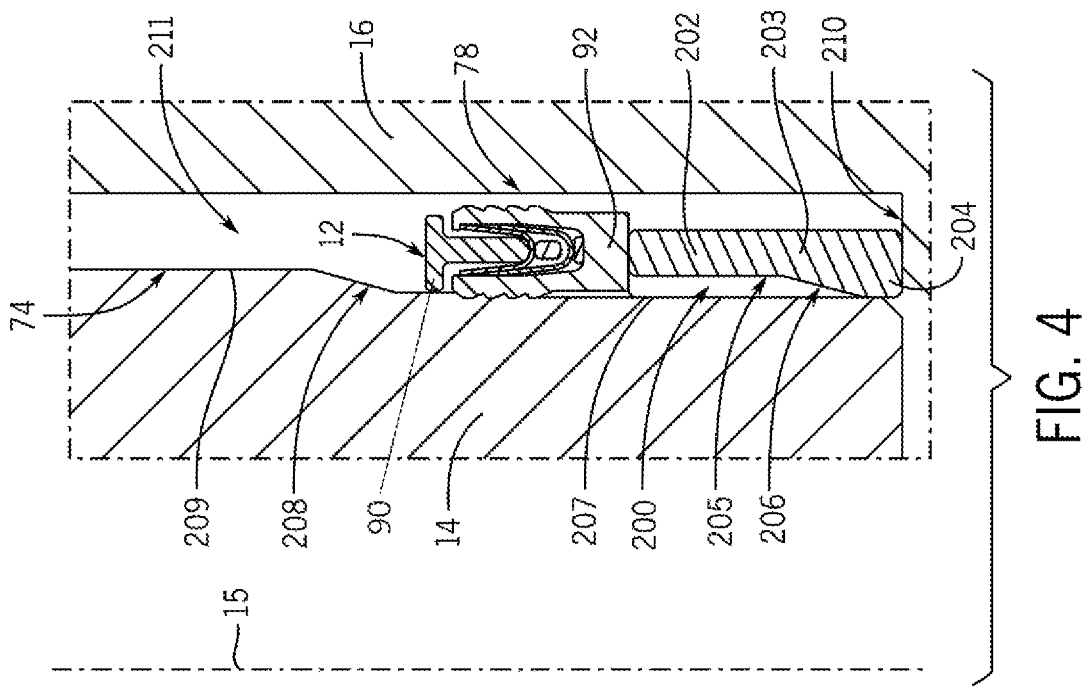

FIGS. 4 and 5 are cross-sectional views of the seal 12, 150 of FIGS. 2 and 3, further illustrating a ramp mechanism 200 (e.g., annular ramp or tapered energizing ring, annular energizing member) that may be utilized to improve installation of the seal 12, 150 within the drilling and production system 10. As illustrated, the ramp mechanism 200 may include a top portion 202 (e.g., annular top portion), an intermediate tapered portion 203 (e.g., tapered annular portion), and a lower portion 204 (e.g., annular bottom portion). The ramp mechanism 200 is configured to energize the seal 12 between the inner and outer bodies 14 and 16 as discussed in further detail below. In the illustrated embodiment, the ramp mechanism 200 and the seal 12 are disposed in an annular recess 205 (e.g., outer annular recess) of the inner body 14, such that the inner body 14 is run into the outer body 16 while carrying the ramp mechanism 200 and the seal 12 in a radially retracted configuration as shown in FIG. 4. Upon reaching a landing position (e.g., ledge 210), the ramp mechanism 200 drives the seal 12 along the inner body 14 and into a seal pocket 211 (e.g., annular seal pocket) between the inner and outer bodies 14 and 16. As discussed below, the ramp mechanism 200 drives the seal 12 along an inner body taper 208 (e.g., tapered annular surface, frustoconical surface), thereby radially expanding the seal 12 from the radially retracted configuration as shown in FIG. 4 into a radially expanded configuration as shown in FIG. 5. Various aspects of the seal 12, the ramp mechanism 200, and the inner body taper 208 are discussed in further detail below.

The different portions 202, 203, and 204 of the ramp mechanism 200 are configured to interface with corresponding surfaces of the inner and outer bodies 14 and 16 while energizing the seal 12. The top portion 202 has a cylindrical profile defined by a rectangular cross-section extending circumferentially about the central axis 15 of the seal 12, wherein the inner and outer diameter of the top portion 202 is uniform along an axial length of the top portion 202. Similarly, the lower portion 204 has a cylindrical profile defined by a rectangular cross-section extending circumferentially about the central axis 15 of the seal 12, wherein the inner and outer diameter of the lower portion 204 is uniform along an axial length of the lower portion 204. However, in the illustrated embodiment, a radial thickness of the lower portion 204 is greater than a radial thickness of the top portion 202. In particular, the inner diameter is the same along both the top and lower portions 202 and 204, whereas the outer diameter is larger in the lower portion 204 relative to the top portion 202. In the illustrated embodiment, the tapered portion 203 has a uniform inner diameter that is the same as the top and lower portions 202 and 204, whereas the tapered portion 203 has a variable outer diameter that gradually increases from the top portion 202 to the lower portion 204. Thus, the tapered portion 203 defines a ramp taper 206 along the outer diameter. The ramp taper 206 may be frustoconical ramp taper, a curved annular ramp taper (e.g., convex or concave ramp taper), or a combination thereof. Thus, the top portion 202 may transition into the lower portion 204 via the ramp taper 206 that connects the top portion 202 with the lower portion 204 of the ramp mechanism 200.

The seal 12 and the ramp mechanism 200 engage one another between the inner and outer bodies 14 and 16 to energize the seal 12. In some embodiments, the lower portion 204 of the ramp mechanism 200 may be configured to be disposed upon a ledge 210 (e.g., annular ledge) of the outer body 16, and the top portion 202 may be configured to interface with the backup ring 92 of the seal 12. In some embodiments, the inner circumferential surface 78 of the outer body 16 may not have a suitable surface finish throughout the length of the surface to receive the seal 12 without causing damage to the seal 12. For example, in some portions of the inner circumferential surface 78, the surface may be rough (e.g., above a 16 surface finish, above a 32 surface finish, above a 63 surface finish, above a 125 surface finish, etc.), debris may be present, or otherwise corrosive materials may be present along the inner circumferential surface 78. When this is the case, it is advantageous to not introduce the seal 12 to the inner circumferential surface 78 until the seal reaches the desired portion of the inner circumferential surface 78 with the appropriate sealing surface finish.

As illustrated in FIG. 4, the ramp mechanism 200 is disposed on the ledge 210 of the outer body 16 with the seal 12, 150 disposed on the top portion 202. As the inner body 14 is assembled into the outer body 16 and translates axially down into the wellhead bore 26, the ramp mechanism 200 drives the seal 12, 150 to slide along the outer circumferential surface 74 of the inner body 14. The outer circumferential surface 74 includes an inner body taper 208 extending axially between inner annular surfaces 207 and 209 (e.g., cylindrical surfaces). The inner annular surfaces 207 and 209 have a constant diameter in the axial direction along the central axis 15, whereas the inner body taper 208 has a variable diameter in the axial direction along the central axis 15. In particular, the diameter of the outer circumferential surface 74 is less in the inner annular surface 207 relative to the inner annular surface 209, and the diameter of the outer circumferential surface 74 gradually increases along the inner body taper 208 from the inner annular surface 207 to the inner annular surface 209. As a result, as the seal 12 is driven in an axial direction along the outer circumferential surface 74 by the ramp mechanism 200, the seal 12 is initially spaced radially away (e.g., radial gap or offset) from the outer body 16 along the inner annular surface 207, whereas the inner body taper 208 gradually drives the seal 12 in a radial outward direction toward and eventually in contact with the outer body 16. As illustrated in FIG. 4, the radial space between the inner body taper 208 and the outer body 16 converges or decreases in a radial dimension from the inner annular surface 207 to the inner annular surface 209. As the ramp mechanism 200 drives the seal 12 further along the inner body taper 208, the seal 12 gradually becomes radially compressed in the radial space (e.g., converging radial space) between the inner and outer bodies 14 and 16 until the seal 12 reaches the inner annular surface 209. Eventually, the ramp mechanism 200 continues to drive the seal 12 in the axial direction into the annular space between the inner annular surface 209 and the outer body 16 for a final seal position between the inner and outer bodies 14 and 16.

As illustrated in FIG. 5, the ramp mechanism 200 has positioned the seal 12 into the final seal position between the inner body 14 and the outer body 16. Additionally or alternatively, the ramp taper 206 may be configured to interface with an inner body taper 208 (e.g., tapered annular surface, frustoconical surface). By utilizing the ramp mechanism 200 and the inner body taper 208, the seal 12, 150 may arrive at the final seal position between the inner body 14 and the outer body 16 without experiencing any of the rough surfaces, debris, or otherwise corrosive materials that may be present along the inner circumferential surface 78 of the outer body 16.

Figure 7:
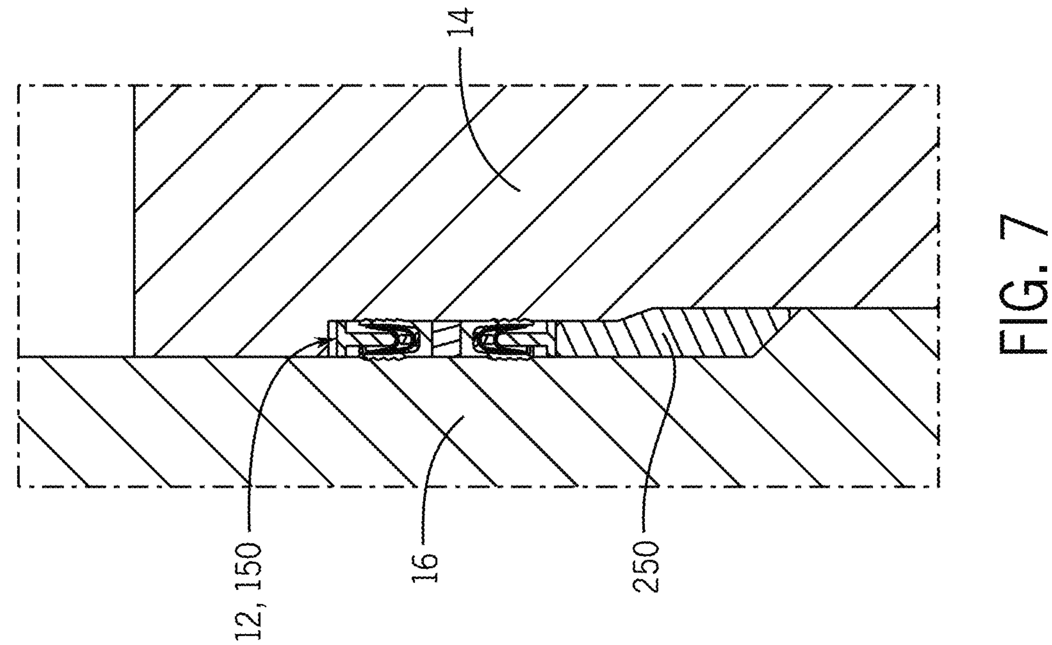
FIGS. 6 and 7 are cross-sectional views of an embodiment of two seals being installed within the drilling and production system of FIG. 1, in accordance with aspects of the present disclosure.
Figure 6:
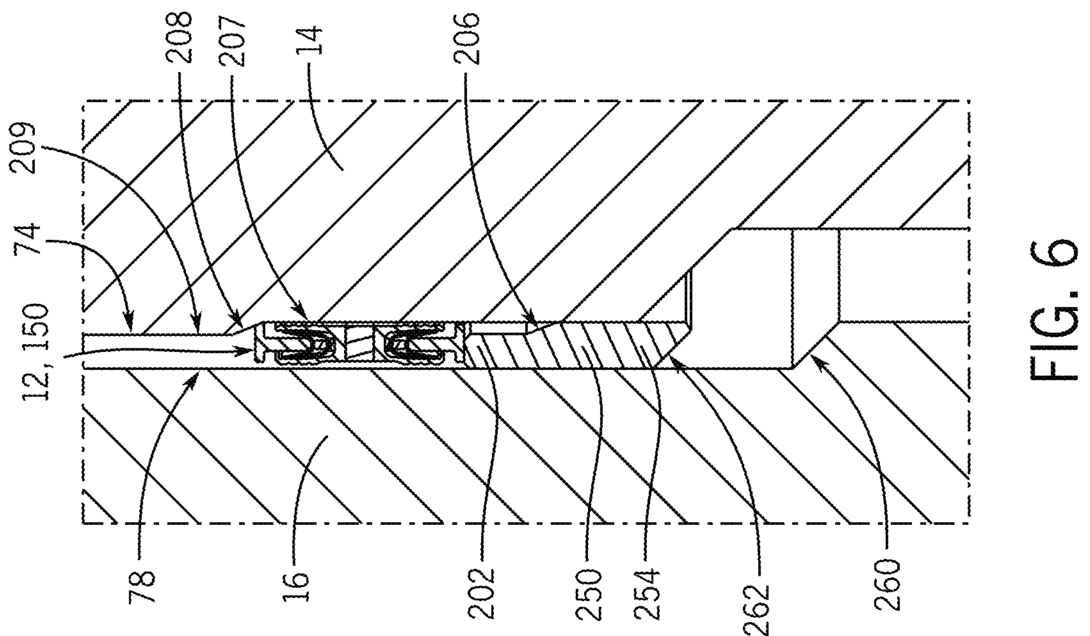

FIGS. 6 and 7 are cross-sectional views of the seal 12, 150 of FIGS. 2 and 3, further illustrating an embodiment of the ramp mechanism 250 that may be utilized to facilitate installation of the seal 12, 150 within the drilling and production system 10. The ramp mechanism 250 is substantially similar to the ramp mechanism 200 in FIG. 4, except for the following differentiating characteristics. For example, the ramp mechanism 250 is configured to assemble two (2) seals 12, 150 into the drilling and production system 10 in between the inner body 14 and the outer body 16. In other embodiments, the ramp mechanism 250 may be utilized to assemble one (1) seal 12, 150 into the drilling and production system 10 in between the inner body 14 and the outer body 16.

Additionally, the ramp mechanism 250 may include a lower portion 254 that includes an additional ramp taper 262. This additional ramp taper 262 may be configured to interface with a ledge taper 260 (e.g., tapered annular ledge, frustoconical ledge) in the outer body 16, in contrast with a planar ledge 210 from FIG. 4. In certain embodiments, the top portion 202 of ramp mechanism 250 may interact with the pakring 90 of the seal 12, 150 rather than the backup ring 92.

As illustrated in FIG. 6, the ramp mechanism 250 may be held in between the inner circumferential surface 78 of the outer body 16 and the outer circumferential surface 74 of the inner body 14 by friction. As the inner body 14 is assembled into the outer body 16 and translates axially down into the wellhead bore 26, the ramp mechanism 250 drives the seal(s) 12, 150 to slide in an axial direction along the outer circumferential surface 74 of the inner body 14. Similar to the embodiment of FIGS. 4 and 5, the outer circumferential surface 74 includes the inner body taper 208 (e.g., tapered annular surface, frustoconical surface) extending axially between inner annular surfaces 207 and 209 (e.g., cylindrical surfaces). As the ramp mechanism 250 drives the seal(s) 12, 150 from the inner annular surface 207, along the inner body taper 208, and onto the inner annular surface 209, the seal(s) 12, 150 are gradually driven in the radial direction and radially compressed between the inner and outer bodies 14 and 16 before reaching a final seal position between the inner annular surface 209 and the outer body 16.

As illustrated in FIG. 7, the ramp mechanism 250 has positioned the seal(s) 12, 150 into the final seal position between the inner body 14 and the outer body 16. Upon reaching the final seal position, the ramp mechanism 250 holds the seal(s) 12, 150 in the final seal position while being axially captured between the inner body taper 208 and the ledge taper 260. In particular, the ramp taper 206 may be configured to interface with the inner body taper 208, and the additional ramp taper 262 may be configured to interface with the ledge taper 260. In some embodiments, the taper angle of the ramp taper 206 and the additional ramp taper 262 may be substantially similar. In other embodiments, the taper angle of the ramp taper 206 may be greater than the taper angle of the additional ramp taper 262, or vice versa. When these surfaces meet, this meeting may prevent the ramp mechanism 250 from continuing to push the seal(s) 12, 150 along the outer circumferential surface 74 of the inner body, thereby enabling the seal(s) 12, 150 to create the fluid barrier between the inner body 14 and the outer body 16. By utilizing the ramp mechanism 250 and the inner body taper 208, the seal(s) 12, 150 may arrive at the desired sealing location between the inner body 14 and the outer body 16 without experiencing any of the rough surfaces, debris, or otherwise corrosive materials that may be present along the inner circumferential surface 78 of the outer body 16.

The technical effect of the disclosed embodiments includes a seal that may be utilized within a drilling and production system 10 that may be operating in harsh environmental and/or operating conditions (e.g., high pressures, high or low temperatures, extreme weather patterns, etc.). The modified seal jacket of the seal may enable the seal to provide a better fluid barrier between a region above the seal and a region below the seal. For example, the modified seal jacket may have a thinner cross-section than conventional seals, as well as increased depths or increased sizes of various protrusions that may be disposed on the inner and/or outer surfaces of the seal jacket. Additionally or alternatively, multiple springs may be disposed within an interior chamber of the seal jacket such that the springs may provide an increased, more evenly distributed biasing force to maintain the fluid sealing barrier. Further, spacers may be disposed between adjacent springs of the multiple springs, maintaining an evenly distributed biasing force along both sides of the seal jacket. Taken together the modified seal jacket geometry, the multiple springs, and the spacer may improve sealing capabilities of present embodiments of the seals, even in harsh environmental conditions. Further, improved methods for installing the improved seals utilize a ramp mechanism to ensure that the thermoplastic material in the seal jacket is not damaged upon installation into the drilling and production system. The ramping mechanism enables the seal to slide into place while avoiding direct interaction with potentially rough surfaces or debris present on an internal circumferential surface within the outer body. Utilizing this ramp mechanism enables the seals to install properly and avoid tears, lacerations, and other detrimental damage to the seal before it arrives at the final sealing location.

The subject matter described in detail above may be defined by one or more clauses, as set forth below.

In certain embodiments, a system includes an annular seal that includes an annular seal jacket, such that the annular seal jacket includes an annular base, first and second annular walls coupled to the annular base, and an annular chamber disposed between the first and second annular walls. Additionally, the annular seal includes a first spring disposed in the annular chamber and a second spring disposed in the annular chamber.

The system of the preceding embodiment, such that each of the first and second springs are disposed against the first and second annular walls.

The system of any preceding embodiment, such that each of the first and second springs has a U-shaped cross-section.

The system of any preceding embodiment, such that each of the first and second springs is an annular spring.

The system of any preceding embodiment, such that the second spring is partially nested within the first spring.

The system of any preceding embodiment, such that the annular seal includes a first spacer disposed between the first and second springs.

The system of any preceding embodiment, such that the annular seal includes a second spacer disposed between the first spring and the annular base.

The system of any preceding embodiment, such that the annular seal includes a seal packing ring disposed at least partially in the second spring.

The system of any preceding embodiment, such that the seal packing ring includes one or more pressure balancing passages.

The system of any preceding embodiment, such that the annular seal includes a backup ring disposed against the annular base of the annular seal jacket.

The system of any preceding embodiment, such that the annular seal is disposed in a carbon capture system.

The system of any preceding embodiment, such that each of the first and second annular walls includes a plurality of annular protrusions.

The system of any preceding embodiment, such that a radial wall thickness of the first and second annular walls is less than or equal to 20 percent of a radial base thickness of the annular base.

The system of any preceding embodiment, including a first annular body configured to be run into a second annular body, such that the annular seal is disposed in an outer annular recess in the first annular body, and the first annular body includes an outer annular surface having a taper configured to drive the annular seal into a seal pocket between the first and second annular bodies.

The system of any preceding embodiment, such that the first annular body includes a hanger.

The system of any preceding embodiment, including an annular energizing member disposed in the outer annular recess adjacent the annular seal.

In certain embodiments, a system includes a first annular body configured to be run into a second annular body, such that the first annular body includes an outer annular recess configured to receive an annular seal and an outer annular surface having a taper configured to drive the annular seal into a seal pocket between the first and second annular bodies.

The system of the preceding embodiment, such that the first annular body includes a hanger.

The system of any preceding embodiment, including the annular seal having multiple U-shaped annular springs disposed in an annular seal jacket.

In certain embodiments, a method includes running a first annular body into a second annular body, such that the first annular body includes an outer annular recess, an annular seal disposed in the outer annular recess, and an outer annular surface having a taper, and drive the annular seal along the taper into a seal pocket between the first and second annular bodies upon reaching a ledge in the second annular body.

The method of the preceding embodiment, such that driving the annular seal includes landing an annular energizing member disposed in the outer annular recess against the ledge, and driving the annular energizing member against the annular seal to drive the annular seal along the taper into the seal pocket.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
- an annular seal, comprising:
  - an annular seal jacket, wherein the annular seal jacket comprises an annular base, first and second annular walls coupled to the annular base, and an annular chamber disposed between the first and second annular walls;
  - a first spring disposed in the annular chamber;
  - a second spring disposed in the annular chamber;
  - a first spacer disposed between the first spring and the second spring;
  - a second spacer disposed between the second spring and the annular base;
  - a backup ring disposed against the annular base opposite the second spacer; and
  - an insert configured to bias the first and second springs in the annular seal jacket, wherein the insert comprises one or more pressure balancing passages, and the one or more pressure balancing passages comprise a transverse passage in an axial portion of the insert.

2. The system of claim 1, wherein each of the first and second springs is disposed against the first and second annular walls.

3. The system of claim 2, wherein each of the first and second springs has a U-shaped cross-section.

4. The system of claim 3, wherein each of the first and second springs is an annular spring.

5. The system of claim 3, wherein the first spring is partially nested within the second spring.

6. The system of claim 1, wherein the insert comprises a seal packing ring disposed at least partially in the first spring and the second spring.

7. The system of claim 6, wherein the seal packing ring comprises a T-shaped cross-section having a head portion coupled to the axial portion, the one or more pressure balancing passages further comprise an axial passage coupled to the transverse passage, and the axial passage terminates inside the axial portion at an axial offset distance away from a distal end of the axial portion.

8. The system of claim 1, wherein the system is a carbon capture system.

9. The system of claim 1, wherein each of the first and second annular walls comprises a plurality of annular protrusions.

10. The system of claim 1, wherein a radial wall thickness of the first and second annular walls is less than or equal to 20 percent of a radial base thickness of the annular base.

11. A system, comprising:
- a first annular body comprising an outer annular recess;
- a second annular body sized to be run into the first annular body; and
- an annular seal positioned at least partially within the outer annular recess and comprising:
  - an annular seal jacket, wherein the annular seal jacket comprises an annular base, first and second annular walls coupled to the annular base, and an annular chamber disposed between the first and second annular walls;
  - a first spring disposed in the annular chamber;
  - a second spring disposed in the annular chamber;
  - a first spacer disposed between the first spring and the second spring;
  - a second spacer disposed between the second spring and the annular base;
  - a backup ring disposed against the annular base opposite the second spacer; and
  - an insert configured to bias the first and second springs in the annular seal jacket, wherein the insert comprises one or more pressure balancing passages, and the one or more pressure balancing passages comprise a transverse passage in an axial portion of the insert, and
- wherein the first annular body further comprises an outer surface having a taper configured to drive the annular seal into a seal pocket formed between the first and second annular bodies when the second annular body is run into the first annular body.

12. The system of claim 11, wherein the first annular body comprises a hanger.

13. A method, comprising:

positioning an annular seal at least partially within an outer annular recess of a first annular body and comprising:

an annular seal jacket, wherein the annular seal jacket comprises an annular base, first and second annular walls coupled to the annular base, and an annular chamber disposed between the first and second annular walls;

a first spring disposed in the annular chamber;

a second spring disposed in the annular chamber;

a first spacer disposed between the first spring and the second spring;

a second spacer disposed between the second spring and the annular base;

a backup ring disposed against the annular base opposite the second spacer; and an insert configured to bias the first and second springs in the annular seal jacket, wherein the insert comprises one or more pressure balancing passages, and the one or more pressure balancing passages comprise a transverse passage in an axial portion of the insert;

running a second annular body into the first annular body; and driving the annular seal along a taper formed in an outer surface of the first annular body and into a seal pocket formed between the first and second annular bodies.

14. The method of claim 13, wherein driving the annular seal comprises driving an annular energizing member of the second annular body extending into the outer annular recess towards a ledge of the first annular body to drive the annular energizing member against the annular seal to drive the annular seal along the taper into the seal pocket.

15. The system of claim 1, wherein the first spacer has a substantially rectangular cross-section defined by a top, a bottom, and opposite first and second sides.

16. The system of claim 15, wherein the first spacer is sized smaller than a space between the first spring and the second spring, and the opposite first and second sides of the first spacer are spaced apart from opposite first and second branches of the second spring.

17. The system of claim 1, wherein the transverse passage extends through opposite first and second sides of the insert facing opposite first and second branches of the first spring.

18. The system of claim 17, wherein the transverse passage is coupled to an axial passage in the insert, and the transverse passage includes a first transverse passage extending from the axial passage to the first side of the insert, and the transverse passage includes a second transverse passage extending from the axial passage to the second side of the insert.

19. The system of claim 11, wherein the one or more pressure balancing passages comprise an axial passage coupled to the transverse passage.

20. The method of claim 13, wherein the one or more pressure balancing passages comprise an axial passage coupled to the transverse passage.

* * * * *